Patented May 26, 1936

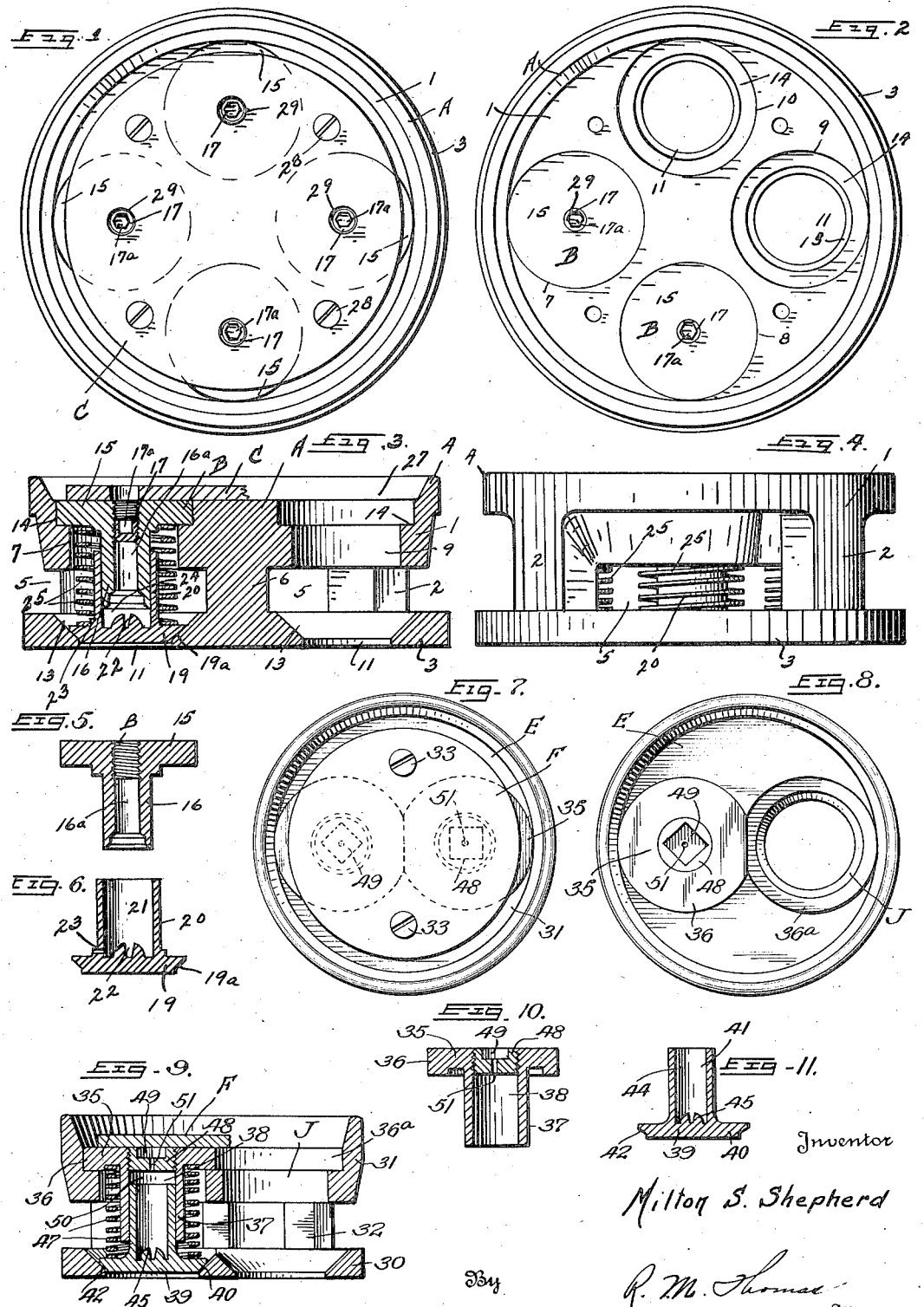

2,041,970

UNITED STATES PATENT OFFICE 2,041,970

COMPRESSOR VALVE AND CAGE

Milton S. Shepherd, Salt Lake City, Utah, assignor of forty per cent to Louis A. Roser, Salt Lake City, Utah Application December 12, 1934, Serial No. 757,099

2 Claims. (Cl. 251—144)

My invention relates to valves for compressors and has for its object to provide a new and efficient and highly economically operating valve which will replace the old types of valves in ammonia or other large compressors.

A further object is to provide a compressor valve which will be quiet in operation, which will give greater efficiency with the same size of compressor cylinder and piston.

A still further object is to provide a compressor valve and cage which will be so constructed that the valve, or valves where more are used, may be ground to a new surface without removing them from the cage.

A still further object is to provide a compressor valve which will have a cage therefor in which the valve seat is formed and the entire assembly will be set into the head of a cylinder to take the place of the valves now used, said valve and cage to be constructed to give longer life, greater efficiency, greater open area when the valves are open and with less maintainance costs with the usual valve of this type.

A still further object is to provide multiple valves for compressors of which the individual valves may be removed separately for cleaning, repairs or re-seating and which valves are air cushioned in their operation to eliminate vibration and noise.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the device

Figure 1 is a plan view of the cage, retainer plate, and multiple valves.

Figure 2 is a plan view of Figure 1 with the retainer plate, two of the valves removed and the other two shown in place.

Figure 3 is a vertical diametrical section of Figure 1, with one of the valve assemblies removed.

Figure 4 is a side elevation of the cage and valves.

Figure 5 is a diametrical section of the valve guide of the valve assembly.

Figure 6 is a diametrical section of the valve.

Figure 7 is a plan view of a modified form showing only two valves with the retainer plate in place.

Figure 8 is a plan view of Figure 7 with the plate removed and one valve assembly removed.

Figure 9 is a diametrical section of Figure 8 with one valve assembly removed.

Figure 10 is a diametrical section of the valve guide.

Figure 11 is a diametrical section of the valve.

In the drawing I have shown the valve cage as A and the cage is made of a top body 1 secured or formed integral with depending posts 2 and the posts 2 are formed to a bottom valve plate 3. The top body A has a flange 4 around the top edge thereof and is of smaller diameter than the valve plate 3 and the openings through the cage A between the body 1 and the valve plate 3 through the spaces 5 between the posts 2 allows the compressed fluids to pass up around the outside of the body 1 through the compressor head (not shown). A center column 6 aids in the forming of the casting of the valve cage and holding the body 1 to the plate 3.

Vertically in the body 1 I then bore the valve assembly chambers 7, 8, 9, and 10, in which the valve assemblies are carried and axially in alignment with these chambers I bore the valve openings 11 with the walls thereof ground on a chamfer as shown in Figures 2 and 3, to form the valve seats 13.

The chambers 7, 8, 9, and 10, are formed with the top ends thereof as a step 14 making the step thereof of larger diameter and into this larger diametered area the valve guide members B are carried. These guide members are all alike and consist of a flat plate 15 adapted to fit into the step cut 14 in the chambers 7, 8, 9, and 10, with a centrally disposed guide stem 16 depending down from the bottom side of the plate. This stem 16 is hollow or cylindrical and the top end of the bore 16a through the plate 15 is internally threaded to receive a closure plug 17. The bottom end of the bore of the stem is chamfered and cut away to make room for the valve grinding boss of the valve head. The valves for the device consist of a valve head 19 carrying a centrally disposed cylindrical stem 20 thereon above the flat place of the head with the chamfered portion 20 to seat in the valve seats 13. The cylindrical stem 20 is bored to fit the guide stem 16 and encircle the stem at all times. Within the bore 21 of the stem 20 on the head 19 I provide a screw driver socket 22 by which the valve head 19 may be rotated to grind the valve into the seat. A port 23 is provided through one side of the stem 20 to allow for escapement of air from the dash pot chamber 24 which is formed between the two stems when they are set together. A closure spring 25 encircles the two stems when they are assembled and set into the chamber and each spring presses against the plate 15 on one end and the head 19 of the valve on the other end to normally hold the valve seated.

A holding or retainer plate C is placed within the depression 27 of the body 1 on top of the valve guide members B and the plate is secured in place by screws 28. Openings 29 are bored through the plate to conform with the bore 16a of the guide members B. To grind the valves when needed, the cage A is removed from the cylinder and the compound is placed on the surface of the valve head and the valve seats. The plugs 17 are removed by inserting a wrench into the socket 17a in the top end thereof and unscrewing them from the threaded portion of the bore 16a. A small shanked screw driver is then inserted through the opening into the dash pot chamber 24 and the valve head rotated as necessary for grinding the valves. Thus, the valves may be ground without removing them from the cage, eliminating much expense and wasted time.

In Figures 7 to 11 inclusive, I have shown a modified form of my device in which the cage is shown as E, the retainer plate as F and in which cage E there are only two valves shown. Other larger types may be used but this shows the use of a different number of valves from that shown in the other figures. The cage is made like the cage A with a valve plate 30 spaced from the body 31 by brackets 32. Valve chambers J are formed in the cage to receive the valve assemblies. The retainer plate is secured to the cage by screws 33. The valve assemblies each consist of a guide member 35 made of a plate 36 adapted to fit into the step cut 36a in the chambers. This guide member has a cylindrical guide stem 37 depending therefrom concentric with the plate 36 with the bore 38 of the stem 37 extending out through the top of the plate 36. The valve 39 is made of a valve head 40 and a valve stem 41. The stem is formed concentric with the head and extends thereabove with the valve face 42 on the opposite side of the valve head. The stem 41 fits up into and operates within the guide stem 37. The valve stem may be made hollow with a bore 44 if desired with the screw driver slot formed in the boss 45 in the bottom of the bore, or the stem may be made solid and the slot cut across the top of the head. The two stems are then encircled by a spring 47 to hold the valve normally seated. The top end of the bore 38 of the guide members 35 is internally threaded to receive the plug 48, and the plug is provided with a wrench socket 49 therein adapted to receive a wrench when it is desired to remove the plug for grinding the valve. The dash pot chamber 50 which is formed within the bore 38 above the stem 41 has a bleeder port 51 formed through the plug 48 to allow for escapement and intake of air from the dash pot chamber so that the valve will operate silently, but will not compress too much air thereabove and prevent opening and closing of the valve.

Having thus described my invention I desire to secure by Letters Patent and claim:

1. In a compressor valve, the combination of a cage having the valve plate spaced from the head of the cage by brackets; a valve opening bored through the plate chamfered to form a valve seat; a valve chamber formed in said cage in alignment with said valve opening in the plate; and a valve assembly comprising a valve adapted to fit into said valve seat with the lower end chamferred to fit said seat; a hollow valve stem formed on the top side of said valve concentric therewith and carrying a screw driver socket in the bottom of the hollow socket; a valve guide carried in said cage having a depending hollow valve guide stem fitting into the hollow valve stem; a spring made of a flat strip of metal wound into concentric convolutions, said spring surrounding said valve stem and engaging the under side of said valve guide within the valve chamber; and a removable plug carried in said hollow valve guide stem said plug to be removed when grinding the valve to allow an instrument to be inserted through the hollow guide stem to grind the valve to its seat.

2. In a compressor valve, the combination of a cage having a cylindrical valve chamber formed therein and with a valve plate spaced from the head of the cage by brackets with the chamferred valve opening and seat formed through said plate; a step cut formed around the top of said valve chamber; a valve carried in said chamber with the valve head fitting said valve seat and having a hollow valve stem extending up from said valve head; a hollow valve guide having a guide stem to fit concentric with said valve stem leaving a chamber within the space in the valve stem and valve guide; a retainer plate secured onto said cage over said valve guide having a threaded perforation therethrough in alignment with the diameter of the hollow in the valve guide; and a perforated plug to be screwed down through the perforation in the guide plate and into the hollow valve guide to close the chamber in the valve stem and guide and to allow a relief port in said chamber, said plug to be removed for grinding of the valve without removing the valve from the cage.

MILTON S. SHEPHERD.